United States Patent [19]
Remsburg

[11] Patent Number: 5,335,947
[45] Date of Patent: * Aug. 9, 1994

[54] QUICK DISCONNECT BALL JOINT COUPLING

[75] Inventor: Ralph Remsburg, Irvine, Calif.

[73] Assignee: Preece Incorporated, Irvine, Calif.

[ * ] Notice: The portion of the term of this patent subsequent to Sep. 9, 2008 has been disclaimed.

[21] Appl. No.: 474,611

[22] Filed: Feb. 5, 1990

[51] Int. Cl.$^5$ .............................................. F16L 35/00
[52] U.S. Cl. .................... 285/316; 285/267; 285/268; 285/269
[58] Field of Search ................... 285/316, 264–270

[56] References Cited

U.S. PATENT DOCUMENTS

| | | |
|---|---|---|
| 1,425,635 | 8/1922 | Dod .................... 285/269 |
| 2,222,612 | 11/1940 | Goff .................... 285/268 |
| 2,424,897 | 7/1947 | Orshansky, Jr. ........ 285/266 |
| 2,550,536 | 4/1951 | Delano, Jr. et al. |
| 2,848,255 | 8/1958 | Klein et al. |
| 3,420,497 | 1/1969 | Wilcox |
| 3,450,421 | 6/1969 | Harwell, Jr. |
| 3,606,393 | 9/1971 | Huntsinger et al. |
| 3,944,263 | 3/1976 | Arnold |
| 3,997,197 | 12/1976 | Marsh et al. |
| 4,269,226 | 5/1981 | Allread |
| 4,413,846 | 11/1983 | Oetiker |
| 4,703,958 | 11/1987 | Fremy |

FOREIGN PATENT DOCUMENTS

| | | | |
|---|---|---|---|
| 582024 | 8/1959 | Canada .................... 285/266 |
| 724676 | 9/1942 | Fed. Rep. of Germany ...... 285/264 |
| 835820 | 4/1952 | Fed. Rep. of Germany ...... 285/268 |
| 2261382 | 6/1974 | Fed. Rep. of Germany ...... 285/267 |
| 512837 | 11/1956 | Italy .................... 285/264 |

Primary Examiner—Eric K. Nicholson
Attorney, Agent, or Firm—Leonard Tachner

[57] ABSTRACT

A novel quick disconnect ball joint coupling which utilizes as a misalignment ball locking mechanism, a combination of a plurality of locking balls and a locking sleeve. The locking sleeve provides an annular race or groove for receiving the locking balls, thereby obviating the high stress point-to-point contact problem associated with prior art locking ball techniques, but still provides the advantage of high speed, low torque rotation available with the use of such locking balls. More specifically, in the present invention, the locking balls do not come in direct contact with the misalignment ball, but are instead positioned in an annular groove on the exterior surface of the locking sleeve between the locking sleeve and the quick disconnect releasing sleeve. The locking sleeve is preferably spring loaded so that upon rotation, the locking sleeve remains stable with respect to the misalignment ball, thereby gaining the benefits of the low friction of a ball and race configuration during rotation. On the other hand, because the locking balls do not directly interface with the misalignment ball, but instead indirectly interface through the much larger surface area of the locking sleeve, even extremely high fluid pressures will not produce the contact stress levels found in the prior art. Accordingly, the present invention provides a novel combination of locking balls and a locking sleeve which affords low point contact stress levels even at high fluid pressures and low torque requirements for rotation.

4 Claims, 2 Drawing Sheets

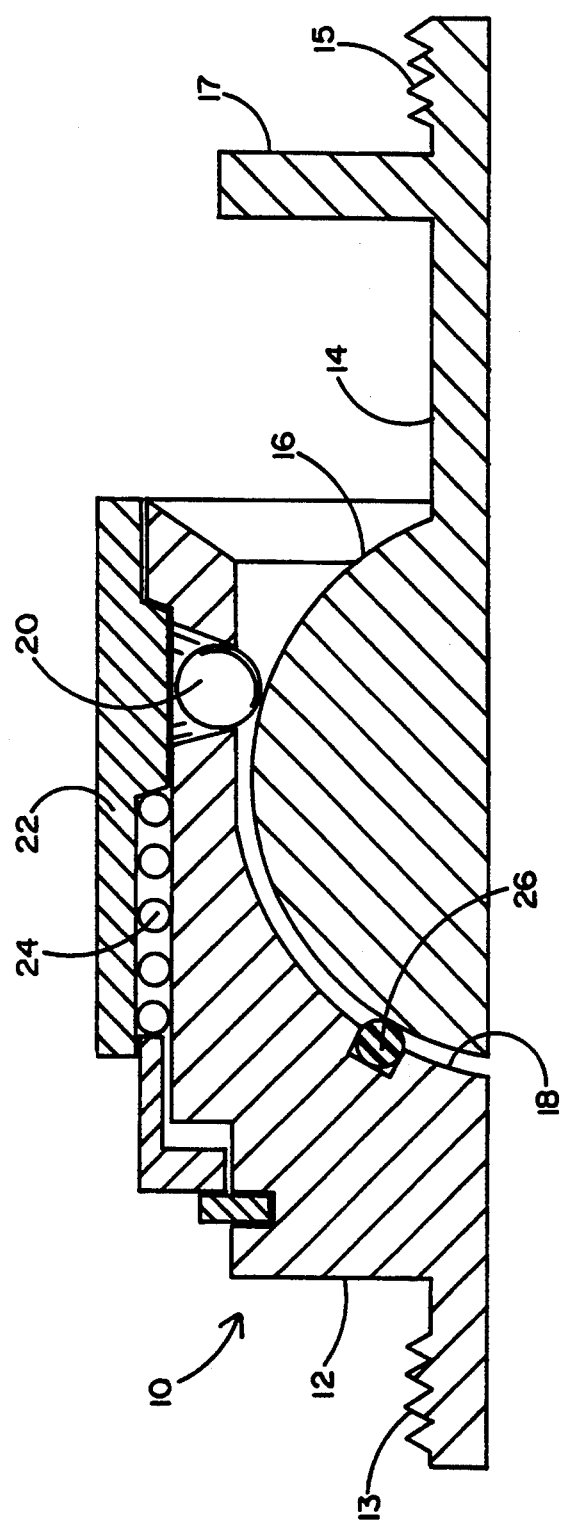
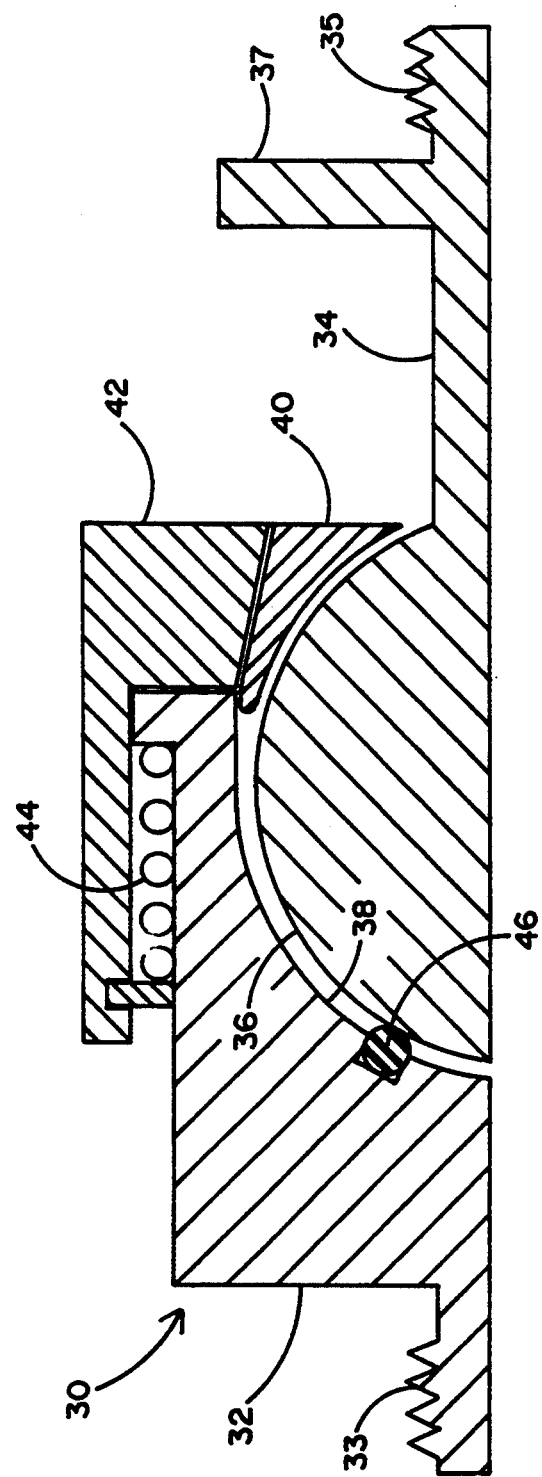
FIG. 1 PRIOR ART
FIG. 2 PRIOR ART

QUICK DISCONNECT BALL JOINT COUPLING

BACKGROUND OF THE INVENTION

1. Field of the Invention

The present invention relates generally to fluid-tight quick disconnect couplings and more specifically to a quick disconnect ball joint coupling in which the conduits through which fluid flows to each half of the coupling may be misaligned and/or rotated when the coupling is engaged.

2. Prior Art

Quick disconnect couplings which must accommodate misaligned conduits are commonly provided in the form of a combined quick disconnect and ball joint. The ball joint coupling is typically held in engagement by means of a large misalignment ball which is locked by a plurality of small locking balls or by a sleeve which has an arched interior surface compatible with the diameter of the misalignment ball. While both of these prior art ball joint configurations permit both misalignment and rotation, they suffer from a number of inherent disadvantages which can preclude their usefulness. By way of example, those prior art combined quick disconnect and ball joint couplings in which the misalignment ball is held in place by a plurality of locking balls can, at particularly high pressure levels, result in the smaller locking balls being embedded into the surface of the larger misalignment ball. On the other hand, some prior art combined quick disconnect and ball joint couplings utilize a sleeve instead of locking balls to secure the misalignment ball in place while distributing the locking contact stress over a much wider surface area. However, these prior art couplings suffer the disadvantage of substantially increased rotational friction, thereby requiring a very high torque to rotate the coupling at high fluid pressure levels. There is therefore an existing need for an improved quick disconnect ball joint coupling in which the point of contact stress levels are reduced, but which at the same time requires only a relatively low torque to enable relative rotation between the male and female members of the quick disconnect.

Prior art relevant to the present invention includes the following United States patents:

U.S. Pat. No. 3,420,497 to Wilcox is directed to a misalignable fluid quick disconnect coupling. A nipple portion terminates in a bulbous spherical section which when captured within the nipple-receiving passage allows relative angular displacement of the nipple relative to the coupling housing. Leakage of fluid is prevented by an O-ring and a seal ring, while the spherical end portion of the nipple is retained within the passage by a plurality of locking balls, which are displaceable within the passage by the axial displacement of a sleeve.

U.S. Pat. No. 2,848,255 to Klein et al is directed to a lubricant fitting for coupling with a grease fitting. The lubricant-receiving fitting has a spherical bulbous head which is received within a cylindrical socket of the coupler body. The coupler is locked on the head of the fitting by the split ring which rides past the collar of the head, but sufficient axial force can be applied to quickly separate the two.

U.S. Pat. No. 4,269,226 to Allread is directed to a breakaway fluid coupling separable by pivotal movement of one coupling part relative to the other. The male coupling part is provided with a spherical segment sealing surface and a spherical segment locking surface which allows pivotal movement of the male portion relative to the female coupling portion. However, if in addition to the swivel force, a tension force is applied, the coupling will separate.

U.S. Pat. No. 3,997,197 to Marsh et al is directed to a ball and socket pipe coupling. The coupling member is provided with a spherically-shaped ball-like enlarged portion which is received within the spherical shaped socket portion of coupling member. The ball and socket arrangement allows the central axes of the coupling members to be inclined at an angle relative to each other while still maintaining a fluid-tight connection. A plurality of jaws or cam members are circumferentially disposed about a housing and pivotably movable to permit a socket of the housing to freely receive the spherically-shaped forward side of the enlarged portion for making engagement therewith.

U.S. Pat. No. 3,450,421 to Hatwell Jr. is directed to a combined flexible joint and remotely connectible and disconnectible union. The ball connector includes a tubular conduit having a ball member for releasable locking engagement with the ball housing member coupled to a second tubular conduit. When the ball is locked within the coupling, the conduits are free to pivot 10 degrees in any direction while a quick disconnect operation is performed by displacing a bearing ring.

U.S. Pat. No. 4,703,958 to Fremy is directed to a quick disconnect type coupling having a radially acting bolt. The balls act against a cylindrical bolt for locking the male member therein.

U.S. Pat. No. 3,606,393 to Huntsinger et al is directed to a pipe connection for underwater well head equipment. Of interest here, is the split retaining ring adapted to engage an external pin groove, and includes a spring bias provided by the coil compression spring which acts against a pin.

U.S. Pat. No. 4,413,846 to Oetiker is directed to a hose coupling with a latching mechanism. As shown in FIG. 1, the coupling includes a latching member and a safety locking member, both having a relatively flat configuration which engage the male coupling member under spring bias.

U.S. Pat. No. 3,944,263 to Arnold is directed to a dynamic pipe coupling having pressure operated seals. The socket portion of the ball type coupling includes three annular seals, each being biased against the ball of the mating portion by means of fluid pressure, as opposed to spring bias balls.

U.S. Pat. No. 2,550,536 to Delano, Jr. et al is directed to a high-pressure ball and socket pipe joint. Of interest here, is the flat ring which is biased by a plurality of spring washers. However, the flat ring is utilized for applying pressure to the packing rings, as opposed to retaining the ball member within the socket member.

SUMMARY OF THE INVENTION

The present invention comprises a combined ball joint and quick disconnect coupling which is particularly advantageous in high pressure fluid applications. The present invention permits locking and rotation to be controlled by means of locking balls while angular misalignment is controlled by a sleeve designed to accept the misalignment ball diameter. This novel combination of locking balls and a sleeve affords low torque rotation, thereby allowing high speed operation, while at the same time, providing the significant advantage of a large surface area contact for reducing stress levels at the point of contact with the misalignment ball. In addition, the novel combination of locking balls and locking sleeve in the present invention provides an advantageous redundancy in that if that the locking ball mechanism should fail, the sleeve that is also provided would still enable rotation, although at a higher torque.

More specifically, in the present invention, the locking balls do not come in direct contact with the misalignment ball, but are instead positioned in an annular groove on the exterior surface of the locking sleeve between the locking sleeve and the quick disconnect releasing sleeve. The locking sleeve is preferably spring loaded so that upon rotation, the locking sleeve remains stable with respect to the misalignment ball, thereby gaining the benefits of the low friction of a ball and race configuration during rotation. This feature is particularly beneficial during low fluid media pressure rotation. On the other hand, because the locking balls do not directly interface with the misalignment ball but instead indirectly interface through the much larger surface area of the locking sleeve, even extremely high fluid pressures will not produce the contact stress levels found in the prior art. Accordingly, the present invention provides a novel combination of locking balls and a locking sleeve which affords low point contact stress levels even at high fluid pressures and low torque requirements for rotation.

OBJECTS OF THE INVENTION

It is therefore a principal object of the present invention to provide a combined quick disconnect and ball joint coupling which is especially suited for use in high pressure fluid applications and which is designed to provide relatively low stress contact point locking of a misalignment ball while simultaneously providing a relatively low torque rotation capability.

It is an additional object of the present invention to provide a misalignable quick disconnect coupling of the type which uses a misalignment ball held in place when coupled by a combination of a locking sleeve and a plurality of locking balls to facilitate low stress contact point engagement of the misalignment ball and simultaneously to facilitate low torque rotation capability of the female member of the coupling relative to the male member of the coupling.

It is still an additional object of the present invention to provide a high pressure capability misalignable quick disconnect coupling capable of high speed rotation torque despite a high contact surface area between the misalignment ball of the coupling and the locking mechanism as a result of a combination of an annularly shaped locking mechanism having grooves for receiving a plurality of locking balls, the former providing control of misalignment and the latter providing control of rotation.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 1 is a half cross-sectional radial view of a prior art quick disconnect ball joint coupling which uses only locking balls to secure the larger misalignment ball;

FIG. 2 is a half cross-sectional radial view of an additional prior art quick disconnect ball joint coupling which uses only a locking sleeve to lock the misalignment ball in place during coupling.

DETAILED DESCRIPTION OF A PREFERRED EMBODIMENT

Figure 3:
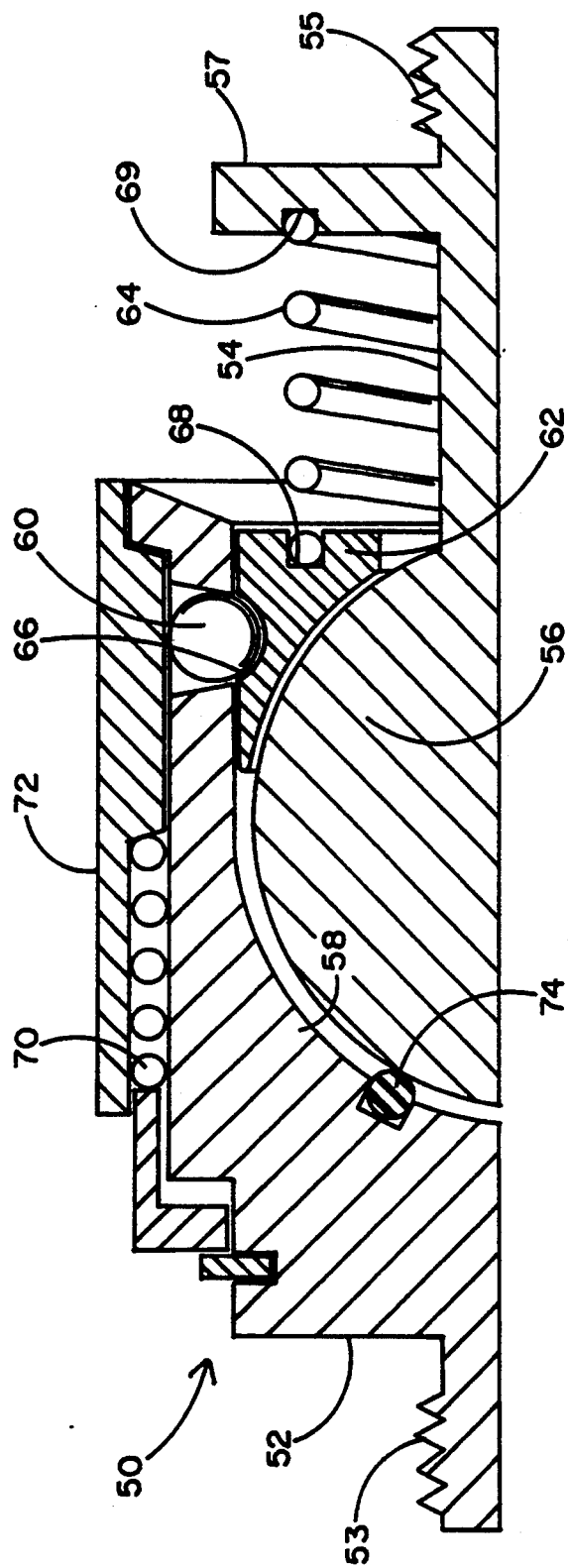
FIG. 3 is a half cross-sectional radial view of the quick disconnect ball joint coupling of the present invention, illustrating the use of the novel combination of a locking sleeve and locking balls.

In order to best understand the design and advantages of the present invention, reference will first be made to FIGS. 1 and 2 which show two prior art configurations of combined quick disconnect and ball joint couplings. More specifically, referring first to FIG. 1, it will be seen that a first exemplary prior art quick disconnect 10 comprises a female member 12 and a male member or nipple 14. Male member 14 provides a misalignment ball 16 which, when members 12 and 14 are interconnected, is held in place within a dimensionally compatible engaging surface 18 of female member 12. A locking engagement between misalignment ball 16 and engaging surface 18 is provided by a plurality of locking balls 20, which are in direct contact with the exterior surface of misalignment ball 16. Female member 12 is provided with a threaded portion 13 which permits connection to a conduit (not shown). Similarly, male member 14 is provided with a threaded portion 15 which permits connection of the male member to a conduit (also not shown). A stop flange 17 may be provided so that there is no inadvertent interference with the interconnection and disconnection between female member 12 and male member 14.

Disconnection or release of the misalignment ball 16 from the engaging surface 18 may be effected by a releasing sleeve 22 which, when moved axially from right to left in FIG. 1 against the pressure of a spring 24, permits the locking balls 20 to separate from the contacting surface of misalignment ball 16, thereby allowing separation of the male member 14 from the female member 12. An O-ring 26 provides a fluid-tight seal between the misalignment ball 16 and the engaging surface 18 when the male member 14 and female member 12 are interconnected in the manner shown in FIG. 1.

The configuration of prior art quick disconnect ball joint coupling 10 of FIG. 1 is exemplary of a number such couplings such as the coupling disclosed in prior art patent 3,420,497 to Wilcox. It serves the desired general purpose of providing a quick disconnect which can accommodate a substantial degree of misalignment between the interconnected conduits and which also permits relative rotation between the male member and the female member thereof. Locking, angular misalignment and rotation are all controlled through the use of the small locking balls 20 placed around the larger misalignment ball 16. Unfortunately, the prior art design of FIG. 1 is limited to very low fluid pressures due to the high stress loading at the ball-to-ball contact point. Thus for example the following formula may be used to calculate the stress at the point of contact between the locking balls 20 and the misalignment ball 16.

$$S = .616 \sqrt[3]{\frac{PE^2}{\left(\frac{D_1 D_2}{D_1 + D_2}\right)^2}}$$

S = Stress at point of contact, PSI.
P = Load, LBs.
E = Modulus of elasticity, PSI.
$D_1$ = Diameter of misalignment ball, IN.
$D_2$ = Diameter of locking ball, IN.

$$\text{LOAD} = \frac{\pi \text{ Fluid seal radius}^2 \times \text{fluid pressure}}{\text{number of locking balls}}$$

Using the above noted formula, it will be seen that for a fluid pressure of 20 PSIG a one inch diameter misalignment ball which is held in the coupled position by sixteen ⅛ inch diameter locking balls, results in a stress at the point of contact of approximately 154,000 PSI, when the sealing surface, that is the diameter of O-ring 26 is ½ inch. This level of contact point stress is acceptable for normal materials used in such quick disconnect ball joint couplings. Unfortunately however, if the fluid pressure is increased to say 8,000 PSIG, the stress increases to 1,134,000 PSI. At this stress level, the smaller locking balls will be embedded into the surface of the larger misalignment ball, damaging the coupling and rendering it virtually useless for misalignment and rotation capabilities.

The prior art alternative shown in FIG. 2 is one way of increasing the stress capability and therefore the high fluid pressure capability of such quick disconnect ball joint couplings. More specifically, as shown in FIG. 2, a quick disconnect 30 comprises a female member 32 and a male member 34, the latter terminating in a connecting or misalignment ball 36. Similarly, the female member 32 comprises an engaging surface 38 which is dimensionally compatible with the misalignment ball 36. As in the first prior art embodiment of FIG. 1, the female member is provided with a threaded portion 33, while the male member is provided with a threaded portion 35 and a stop flange 37. An O-ring 46 provides the same type of fluid sealing between the misalignment ball 36 and the engaging surface 38 of female member 32 when the coupling is connected.

However, unlike the first prior art configuration of FIG. 1, in the prior art configuration of FIG. 2 the misalignment ball 36 is held in place by a locking sleeve 40 which is, in turn, positioned in locking engagement with the misalignment ball 36 by a releasing sleeve 42 and a spring 44. Locking sleeve 40 is actually an annular segment of a spherical shell having an inner diameter which is dimensionally compatible with the outer diameter of misalignment ball 36. Consequently, unlike the prior art configuration of FIG. 1, the prior art configuration of FIG. 2 provides a substantially greater surface area contact between the locking mechanism, that is locking sleeve 40 and the sphere 36. The prior art configuration of FIG. 2 is similar to those shown in U.S. Pat. No. 2,848,255 to Klein et al, U.S. Pat. No. 3,997,197 to Marsh et al and U.S. Pat. No. 4,298,219 to Amelink. Because this particular prior art configuration overcomes the point-to-point contact problem of the prior art configuration of FIG. 1, it has clearly a much higher fluid pressure capability. It allows locking, angular misalignment and rotation to be controlled through the use of the segmented sleeve 40 which is designed to accept the misalignment ball diameter. Unfortunately however, the rotational speed of the spin of the male member 34 relative to the female member 32 is limited and the torque required to produce such relative rotation is quite high due to the friction of the high surface area contact between the sleeve 40 and the misalignment ball 36.

Consequently, in comparing the prior art configurations of FIG. 1 and 2, one can readily see that in the prior art of quick disconnect ball joint couplings, there is of necessity a choice to be made between high pressure performance and locking misalignment on the one hand and low torque rotation on the other. Therefore, when it is necessary to specify both high pressure misalignment capability and low torque high rotational speed capability, the prior art has unfortunately not provided a solution compatible with both such capabilities. Fortunately, the present invention provides a solution to this incompatability of the prior art.

More specifically, as seen in FIG. 3, the quick disconnect 50 of the present invention comprises a female member 52 and a male member 54, the latter having a misalignment ball 56 of the same configuration disclosed and discussed previously in conjunction with FIGS. 1 and 2. Female member 52 provides a threaded portion 53 while male member 54 provides a threaded portion 55 and a stop flange 57. A spherically shaped, dimensionally compatible engaging surface 58 is also provided as in the previous prior art configurations. However, the locking mechanism for retaining the misalignment ball 56 in engagement with the engaging surface 58 is quite distinct from both prior art configurations in FIG. 1 and 2 in that it comprises both a plurality of locking balls 60 and a locking sleeve 62, the latter being held in its position relative to misalignment ball 56 by a spring 64. Spring 64 is positioned in a spring receiving groove 68 in the locking sleeve 62 at one axial end and in a spring receiving groove 69 in the stop flange 57 at its other axial end. Locking sleeve 62 also provides a ball receiving groove 66 in which the locking balls 60 reside when the male and female members are interconnected in the manner shown in FIG. 3. A second spring 70 and a releasing sleeve 72 provide a means for releasing the male and female members relative to one another, much the same way as spring 24 and sleeve 22 function in the prior art configuration of FIG. 1 and an O-ring 74 provides the same sealing effect as is provided by O-rings 26 and 46 of the prior art configurations of FIGS. 1 and 2 respectively. If it is desired to disconnect male member 54 from female member 52, one merely axially slides releasing sleeve 72 from right to left as seen in FIG. 3, compressing spring 70 and allowing the locking balls 60 to separate from the ball receiving groove 66 of locking sleeve 62. It is then easy to readily translate the male member 54, including the misalignment ball 56, the locking sleeve 62 and spring 64, to the right as seen in FIG. 3.

It will be observed that the inventive configuration of the present invention shown in FIG. 3 provides both the high pressure capability of the prior art configuration of FIG. 2 and the high rotation speed low torque capability of the prior art configuration of FIG. 1. It allows the locking and rotation to be controlled through the locking balls 60 while angular misalignment is controlled by locking sleeve 62 designed to accept the misalignment ball diameter. Thus, there is only low torque required during rotation, allowing high speed operation. The design of FIG. 3 does not have the point-to-point contact of the design of prior art configuration of FIG. 1. Instead, the locking balls rest in a groove larger than the locking ball diameter, that groove being in locking sleeve 62. The approximate formula for stress at the point of contact is the following:

$$S = .616 \sqrt[3]{\frac{PE^2}{\left(\frac{D_1 D_2}{D_1 - D_2}\right)^2}}$$

S = Stress at point of contact, PSI.
P = Load, LBs.
E = Modulus of elasticity, PSI.
$D_1$ = Diameter of misalignment ball, IN.
$D_2$ = Diameter of locking ball, IN.

$$LOAD = \frac{\pi \text{ Fluid seal radius}^2 \times \text{fluid pressure}}{\text{number of locking balls}}$$

The novel design configuration of the invention shown in FIG. 3 allows a larger number of locking balls to be Used. Thus in the formula above, $D_2$ becomes 0.130 inches instead of 0.125 and the number of balls increases to 20. In this design, the ball load stress at 8000 PSIG fluid pressure is only 111,000 PSI. Thus, the present invention requires a very low torque to be applied to the misalignment ball for rotation as compared to the design of prior art FIG. 2. One secondary, but nevertheless significant advantage of the inventive configuration of FIG. 3 is its redundancy. More specifically, if the locking ball mechanism should fail, the locking sleeve 62 would still be able to accept rotation, although at the higher torque comparable to the prior art configuration of FIG. 2. The present invention provides the significant advantage of being compatible with requirements for both high pressure misalignment and locking capability, as well as high speed, low torque rotation.

It has been shown in the present invention that stress levels are down from 1,134,000 PSI to 111,000 PSIG over the prior art of FIG. 1 for 8,000 PSIG fluid pressure. To demonstrate the advantage in friction over the prior art of FIG. 2, the theoretical formula is:

$$M_t = PfR_f$$

where
$M_t$ = Friction torque moment, IN-LB
P = Load, LBs.
f = Coefficient of friction $$R_f = \text{Friction radius} = 2/3 \left(\frac{R_0^3 - R_I^3}{R_0^2 - R_I^2}\right)$$

$R_0$ = Outer radius of contact surface
$R_I$ = Inner radius of contact surface

For the prior art of FIG. 2, $R_0$ would theoretically be the radius of the misalignment ball, 36. $R_I$ would be approximately $R_0$— the equivalent diameter of the locking sleeve 40.

For the present invention $R_0$ would be approximately ½ the locking ball (60) diameter + the radius of the misalignment ball 56. $R_I$ is approximately the radius of the misalignment ball 56, −the radius of the locking ball 60.

For comparison purposes, the major difference is f, the coefficient of friction. For a single row ball bearing configuration of the invention f=0.0015. The configuration of prior art in FIG. 2 resembles a cone clutch. The coefficient of friction for lubricated steel on steel is 0.16. Even for lubricated steel on sintered bronze, the coefficient of friction is only reduced to 0.12.

The derived formula for the prior art of FIG. 2 is:

$$M_t = PfR_f$$

Where
$M_t$ = Friction torque moment, IN-LB
P = Load, LBs.
LOAD = $\pi$ fluid seal radius, $IN^2 \times$ fluid pressure, PSIG
f = Coefficient of friction $$R_f = \text{Friction radius} = 2/3 \left(\frac{R_0^3 - R_I^3}{R_0^2 - R_I^2}\right)$$

$R_0$ = Outer radius of contact surface = $D_1/2$
$R_I$ = Inner radius of contact surface = $R_0 - D_2$
$D_1$ = Diameter of misalignment ball, IN
$D_2$ = Diameter of locking ball, IN Therefore, a ½ inch seal holding 8,000 PSIG fluid and a 1 inch steel misalignment ball on a sintered bronze retainer would require 82.7 IN-LBs of torque.

The formula for the present invention is basically the same except:

$$R_0 = D_1/2 + D_2/2$$

Therefore, a ½ inch seal holding 8,000 PSIG fluid and a 1 inch steel misalignment ball with 0.130 inch steel locking balls would require 1.19 IN-LBs of torque to rotate.

It will now be understood that what has been disclosed herein, comprises a novel quick disconnect ball joint coupling which utilizes as a misalignment ball locking mechanism, a combination of a plurality of locking balls and a locking sleeve. The locking sleeve provides an annular race or groove for receiving the locking balls, thereby obviating the high stress point-to-point contact problem associated with prior art locking ball techniques, but still provides the advantage of high speed, low torque rotation available with the use of such locking balls. Thus the present invention provides the advantages of both of the prior art configurations of FIGS. 1 and 2 herein, but without the disadvantages of either.

Those having skill in the art to which the present invention pertains, will now as a result of the applicant's teaching herein, perceive various modifications and additions which may be made to the invention. By way of example, the relative sizes of the misalignment ball, locking sleeve and locking balls may be readily altered. Furthermore, the precise mechanism for holding the locking sleeve in place as well as the relative positions of the locking ball and locking sleeve may be readily changed. In addition, other means for releasing the misalignment ball from its locked position for disconnecting the male member from the female member may also be provided. Accordingly, all such modifications and additions are deemed to be within the scope of the invention which is to be limited only by the claims appended hereto.

I claim:

1. An improved quick disconnect ball joint coupling of the type having a male member and a female member, both having a fluid passage, the male member having a misalignment ball and the female member having a spherical engaging surface for receiving the misalignment ball in sealing engagement therewith for permitting fluid flow through the coupling from misaligned fluid conduits connected to the male and female members, respectively; the improvement comprising:

a locking sleeve having a spherical segment interior surface for engaging said misalignment ball in relative moveable relation about the center of said misalignment ball;

said locking sleeve having a grooved exterior surface forming a ball race;

a plurality of locking balls rotatably positioned in said ball race for locking said locking sleeve and said misalignment ball relative to said spherical engaging surface to prevent decoupling of said male member and said female member;

means for selectively constraining said locking balls in said ball race for coupling said male and female members and for alternately releasing said locking balls from said ball race for decoupling said male and female members;

whereby said locking sleeve enables axial misalignment of said male and female members and said locking balls enable relative rotation of said male and female members;

wherein said constraining and releasing means comprises a spring-loaded cylindrical sleeve forming an axially moveable radial surface of said female member, said cylindrical sleeve having an interior surface of at least two different diameters, one such interior surface diameter forcing said locking balls to be positioned within said ball race and the other such interior surface diameter permitting said locking balls to be released from said ball race.

2. An improved quick disconnect ball joint coupling of the type having a male member and a female member, both having a fluid passage, the male member having a misalignment ball and the female member having a spherical engaging surface for receiving the misalignment ball in sealing engagement therewith for permitting fluid flow through the coupling from misaligned fluid conduits connected to the male and female members, respectively; the improvement comprising:

a locking sleeve having a spherical segment interior surface for engaging said misalignment ball in relative moveable relation about the center of said misalignment ball;

said locking sleeve having a grooved exterior surface forming a ball race;

a plurality of locking balls rotatably positioned in said ball race for locking said locking sleeve and said misalignment ball relative to said spherical engaging surface to prevent decoupling of said male member and said female member;

means for selectively constraining said locking balls in said ball race for coupling said male and female members and for alternately releasing said locking balls from said ball race for decoupling said male and female members;

whereby said locking sleeve enables axial misalignment of said male and female members and said locking balls enable relative rotation of said male and female members; and a cylindrical spring affixed at one axial end to said locking sleeve and affixed at the other axial end to said male member.

3. A quick disconnect ball joint coupling comprising:

a male member having a fluid passage and a connecting ball;

a female member having a fluid passage and a spherically shaped surface for receiving said connecting ball in sealed, axial misalignable relation, said spherically shaped surface terminating in a substantially cylindrical portion having an annular compartment;

a spherical segment annular sleeve having an interior surface abutting said connecting ball and having an annular groove along n exterior surface; and a plurality of locking balls located in said annular compartment and selectively positioned to protrude into said annular groove to lock said annular sleeve to said female member while permitting relative axial rotation between said male and female members;

means for affixing said annular sleeve to said male member while permitting limited motion between said annular sleeve and the surface of said connecting ball;

said affixing means comprises a spring; and wherein said spring is a cylindrical spring having a first axial end affixed to said annular sleeve and a second axial end affixed to said male member at a location spaced from said connecting ball.

4. A quick disconnect ball joint coupling comprising:

a male member having a fluid passage and a connecting ball;

a female member having a fluid passage and a spherically shaped surface for receiving said connecting ball in sealed, axial misalignable relation, said spherically shaped surface terminating in a substantially cylindrical portion having an annular compartment;

a spherical segment annular sleeve having an interior surface abutting said connecting ball and having an annular groove along an exterior surface; and a plurality of locking balls located in said annular compartment and selectively positioned to protrude into said annular groove to lock said annular sleeve to said female member while permitting relative axial rotation between said male and female members;

means for selectively constraining the position of said locking balls relative to said annular groove for preventing relative translational motion between said male and female members; and wherein said constraining means comprises a spring loaded cylindrical sleeve positioned about the exterior radial surface of said female member.

* * * * *